United States Patent Office 2,804,449
Patented Aug. 27, 1957

2,804,449

POLYCHLOROPRENE DITHIOBIURET ACCELERATION

Ralph A. Naylor, Stamford, Conn., assignor to American Cyanamid Company, New York, N. Y., a corporation of Maine No Drawing. Application February 26, 1954,
Serial No. 412,952

7 Claims. (Cl. 260—92.3)

This invention relates to the vulcanization of rubber. More particularly it is concerned with the vulcanization of a chloroprene rubber and still more specifically it relates to the vulcanization of a nonsulfur-modified chloroprene rubbers designated as Neoprene Type "W," Type "WHV" and Type "WRT."

It has been known prior to this invention that polymerized 2-chloro butadiene 1,3 could be vulcanized with or without the aid of a vulcanization assistant. However, the chloroprene rubber so vulcanized or cured was deficient with respect to vulcanization properties, such as modulus (i. e., stress at 300% elongation), tensile strength, percent elongation at the breaking point or aging characteristics. In general, accelerators for rubber were of little or no value in curing synthetic rubbers known as polymerized chloroprene.

According to this invention, these difficulties are surprisingly and readily overcome by adding to a formulation of chloroprene rubber a dithiobiuret vulcanization accelerator characterized by the formula:

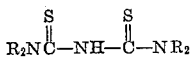

wherein R is hydrogen; alkyl such as methyl, ethyl, propyl; aryl such as phenyl, tolyl, xylyl, naphthyl, or biaryl such as biphenyl, bitolyl, or bixylyl.

Any synthetic chloroprene rubber made by polymerizing-2-chlorobutadiene 1,3 (known as neoprene) may be vulcanized or cured by adding the designated accelerator to an unvulcanized composition. Alternatively, the accelerator may be added to a partially cured neoprene polymer. As a preferred embodiment of the invention, it is preferred to accelerate the vulcanization of Neoprene Type "W". The latter neoprene is a nonsulfur-modified rubber made by the emulsion polymerization of chloroprene (2-chlorobutadiene 1,3) and which is devoid of sulfur, thiuram disulfide, or other compounds capable of decomposing to provide either free sulfur or a vulcanization accelerator.

The amount of accelerator added to the rubber composition may vary from 0.25 to 2.5 parts per 100 parts of polymer. However, for most purposes the average range of accelerator is from about 0.5 to 1.5 parts per 100 parts of polymer.

Temperatures which can be employed to cure neoprene polymer compositions may vary from about 120° C. to 200° C. depending on the time of cure and amount of accelerator added. In general, when adding larger amounts of accelerator to the composition and employing a longer curing time, the temperature should proportionately be reduced. It has been found that for the customary time of cure and accelerator addition, the temperature of curing may vary from about 140° C. to about 160° C. For excellent results, a temperature of 153° C. is employed.

In the examples which follow, a typical stock formulation with or without a vulcanization assistant is illustrated to which, however, this invention is not to be limited. The parts in these examples are by weight.

Example 1

A batch mixture comprising the following:

| | |
|---|---|
| Neoprene Type W | 100 |
| Phenyl alpha naphthylamine | 2 |
| Stearic acid | 0.5 |
| Light calcined magnesia | 2 |
| Semi reinforcing furnace (S. R. F.) black | 29 |
| Zinc oxide | 5 |
| Dithiobiuret | 0.5 | is cured at 153° C. for 10, 20, and 40 minutes, respectively.

Example 2

Example 1 is repeated with the omission of a vulcanization assistant.

Example 3

Following the procedure of Example 1, phenyl dithiobiuret replaces dithiobiuret.

Example 4

In this example, o-tolyl dithiobiuret replaces the accelerator of Example 1.

Example 5

The procedure of Example 1 is followed except N-phenyl-N-ethyl dithiobiuret replaces dithiobiuret.

Example 6

The procedure of Example 1 is followed except o-biphenyl dithiobiuret replaces the accelerator therein.

The characteristics of the neoprene thus vulcanized in the foregoing examples are tabularized below.

| Example | Accelerator | Scorch [1] | Modulus at 300% | Tensile | Percent Elong. | Modulus at 300% | Tensile | Percent Elong. | Modulus at 300% | Tensile | Percent Elong. |
|---|---|---|---|---|---|---|---|---|---|---|---|
| 1 | Dithiobiuret | 10 | 1,225 | 3,400 | 600 | 1,350 | 3,300 | 530 | 1,425 | 3,425 | 520 |
| 2 | (None) | over 70 | 75 | 600 | 900 | 500 | 2,575 | 800 | 575 | 2,700 | 780 |
| 3 | Phenyl dithiobiuret | 8 | 975 | 3,200 | 605 | 1,125 | 3,225 | 565 | 1,125 | 3,200 | 555 |
| 4 | o-Tolyl-dithiobiuret | 6 | 1,150 | 3,175 | 600 | 1,150 | 3,200 | 580 | 1,150 | 3,225 | 570 |
| 5 | N-phenyl-N-ethyl-dithiobiuret | 6 | 975 | 2,300 | 690 | 925 | 3,275 | 670 | 975 | 3,250 | 660 |
| 6 | o-Biphenyl dithiobiuret | 6 | 1,250 | 3,315 | 580 | 1,150 | 3,350 | 620 | 1,200 | 3,500 | 620 |

[1] Mooney scorch—time in minutes for a ten point rise above the minimum reading using the small rotor at 250° F.
Modulus and tensile strength in p. s. i.

The vulcanized rubber made in accordance with this invention is useful for services where improved strength is desirable in addition to the normally good oil and heat resistance of the polymer, for example, as gasoline filling hoses or motor mountings.

Suitable variations and changes in the invention may be made without departing from the spirit thereof or the scope of the appended claims.

I claim:

1. A process for improving the modulus, tensile strength and elongation of chloroprene rubber compositions comprising adding to an unvulcanized vulcanizable chloroprene rubber composition between 0.25% and 2.5% of a dithiobiuret accelerator, said accelerator being characterized by the formula:

$$R_2NC(S)-NH-C(S)-NR_2$$

wherein R is selected from the group consisting of hydrogen, alkyl, aryl and biaryl, and curing said composition at vulcanization temperatures.

2. The process according to claim 1 wherein the chloroprene rubber is a nonsulfur-modified chloroprene polymer.

3. The process according to claim 1 wherein the accelerator is dithiobiuret.

4. The process according to claim 1 wherein the accelerator is phenyl dithiobiuret.

5. The process according to claim 1 wherein the accelerator is o-tolyl dithiobiuret.

6. The process according to claim 1 wherein the accelerator is N-phenyl-N-ethyl dithiobiuret.

7. The process according to claim 1 wherein the accelerator is o-biphenyl dithiobiuret.

References Cited in the file of this patent

UNITED STATES PATENTS 2,544,746    Baum               Mar. 13, 1951